(12) United States Patent
Bumgardner et al.

(10) Patent No.: US 9,797,707 B2
(45) Date of Patent: Oct. 24, 2017

(54) ELECTRONIC GAGE APPARATUS

(71) Applicant: The Boeing Company, Chicago, IL (US)

(72) Inventors: Mark D. Bumgardner, Enumclaw, WA (US); Jonathan A. Schweiger, Seattle, WA (US); Christopher M. Gorsh, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 721 days.

(21) Appl. No.: 14/150,724

(22) Filed: Jan. 8, 2014

(65) Prior Publication Data
US 2015/0192410 A1    Jul. 9, 2015

(51) Int. Cl.
G01B 11/02    (2006.01)
G01B 11/30    (2006.01)
G01D 5/34     (2006.01)

(52) U.S. Cl.
CPC ........ G01B 11/02 (2013.01); B65H 2553/416 (2013.01); G01B 11/303 (2013.01); G01D 5/342 (2013.01)

(58) Field of Classification Search
None
See application file for complete search history.

(56) References Cited

U.S. PATENT DOCUMENTS 4,549,207 A * 10/1985 Boshier .................. G01B 11/14
                                                   348/141
4,876,800 A * 10/1989 Pekar ........................ G01B 7/06
                                                   33/784
7,913,414 B2    3/2011 Bumgardner et al.
2005/0007108 A1* 1/2005 Dogaru ................ G01N 27/904
                                                   324/235
2012/0151788 A1* 6/2012 Miller ...................... G01B 7/26
                                                   33/701

FOREIGN PATENT DOCUMENTS

FR    2635382 A1    2/1990
GB    1033811 A     6/1966
WO    2006092300 A2  9/2006

OTHER PUBLICATIONS

Machine translation of WO2006092300 A2 (2006).*
Machine translation of FR2635382 A1 (1990).*
International Search Report and Written Opinion dated Dec. 22, 2014, 10 pages.

* cited by examiner

Primary Examiner — Alexander Satanovsky
Assistant Examiner — John Kuan
(74) Attorney, Agent, or Firm — Patterson + Sheridan, LLP

(57) ABSTRACT

A gage apparatus includes a probe, a processor, and a memory. The probe includes a plurality of transmitters and a plurality of receivers both aligned in an axial direction along the probe. The processor is in electronic communication with the plurality of transmitters and the plurality of receivers. The memory is in electronic communication with the processor. The memory includes programming code for execution by the processor. The programming code is configured to determine a length of a structure disposed adjacent to the probe based on which of the plurality of receivers receive signals transmitted by the plurality of transmitters and reflected off the structure.

21 Claims, 7 Drawing Sheets

ELECTRONIC GAGE APPARATUS

FIELD OF THE DISCLOSURE

This disclosure relates to electronic gage apparatus for measuring lengths.

BACKGROUND

Typically gage apparatus for measuring lengths of structures or for determining a length of a fastener to be installed into a structure rely on internal mechanical components requiring physical movement and contact with each other to obtain the measurement. These gage apparatus often require the measuring mechanism to be powered by compression of a human hand or an internal mechanical mechanism. This introduces variables that may lead to fatigue, mechanical wear, break-down, or an increase in error likelihood.

A system and method is needed to measure lengths of structures or for determining a length of a fastener to be installed into a structure while reducing or eliminating one or more issues of the existing gage apparatus.

SUMMARY

In one embodiment, a gage apparatus is disclosed. The gage apparatus includes a probe, a processor, and a memory. The probe includes a plurality of transmitters and a plurality of receivers both aligned in an axial direction along the probe. The processor is in electronic communication with the plurality of transmitters and the plurality of receivers. The memory is in electronic communication with the processor. The memory includes programming code for execution by the processor. The programming code is configured to determine a length of a structure disposed adjacent to the probe based on which of the plurality of receivers receive signals transmitted by the plurality of transmitters and reflected off the structure.

In another embodiment, a system for measuring a length of a hole through a structure is disclosed. The system includes a probe, a plurality of transmitters and a plurality of receivers both disposed upon and aligned in an axial direction along the probe, a processor, and a memory. The processor is in electronic communication with the plurality of transmitters, the plurality of receivers, and the memory. The memory includes programming code for execution by the processor. The programming code is configured to determine a length of the hole through the structure based on which of the plurality of receivers receive signals transmitted by the plurality of transmitters and reflected off the structure.

In still another embodiment, a method of measuring a length is disclosed. In one step, a probe is inserted into a hole associated with a structure. In another step, signals are transmitted from a plurality of transmitters aligned along an axial direction of the probe and at least a portion of the transmitted signals are reflected off the structure. In still another step, the signals reflected by the structure are received with a plurality of receivers aligned along the axial direction of the probe. In yet another step, a processor in electronic communication with the plurality of transmitters, the plurality of receivers, and a memory determines, by the processor executing programming code stored in the memory, a length of the hole through the structure based on which of the plurality of receivers receive the reflected signals.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
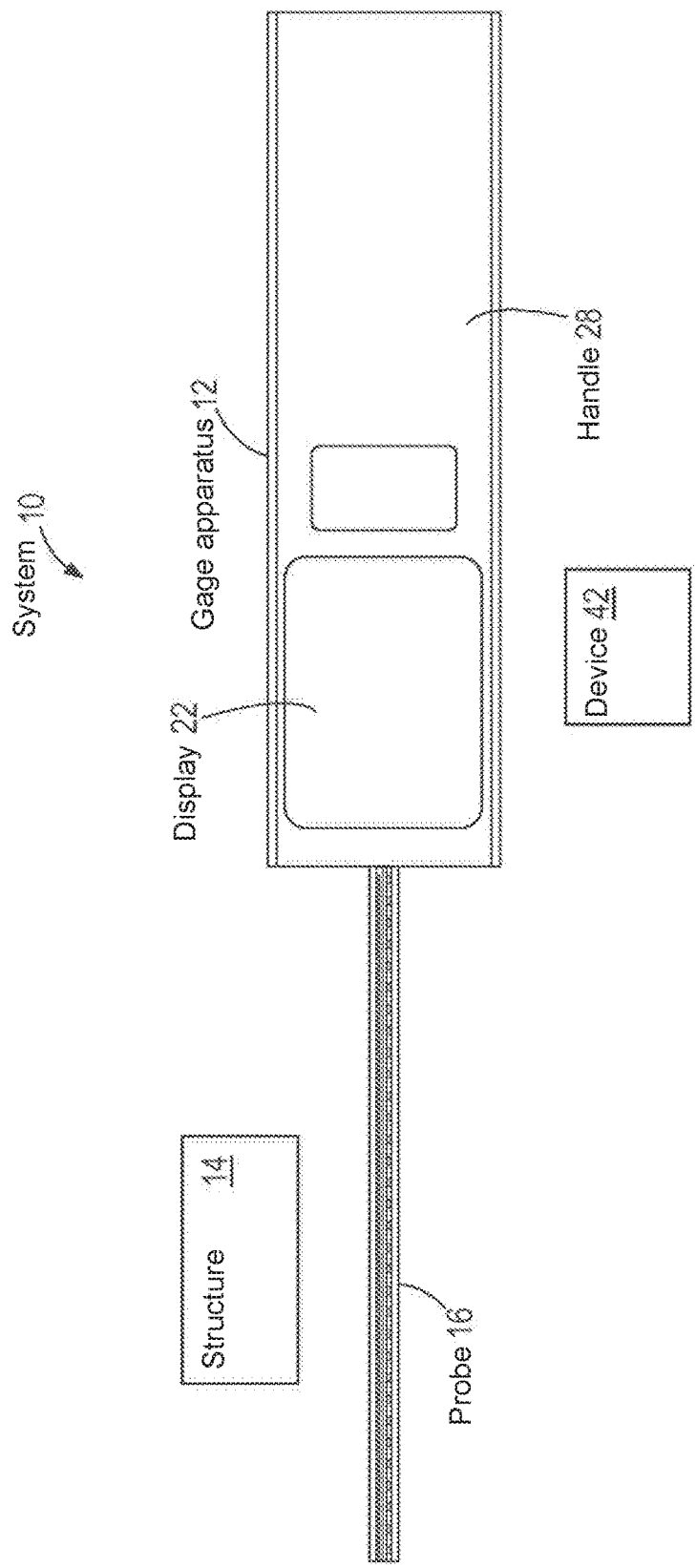
FIG. 1 illustrates a perspective view of one embodiment of a system comprising a gage apparatus and a structure.
Figure 2:
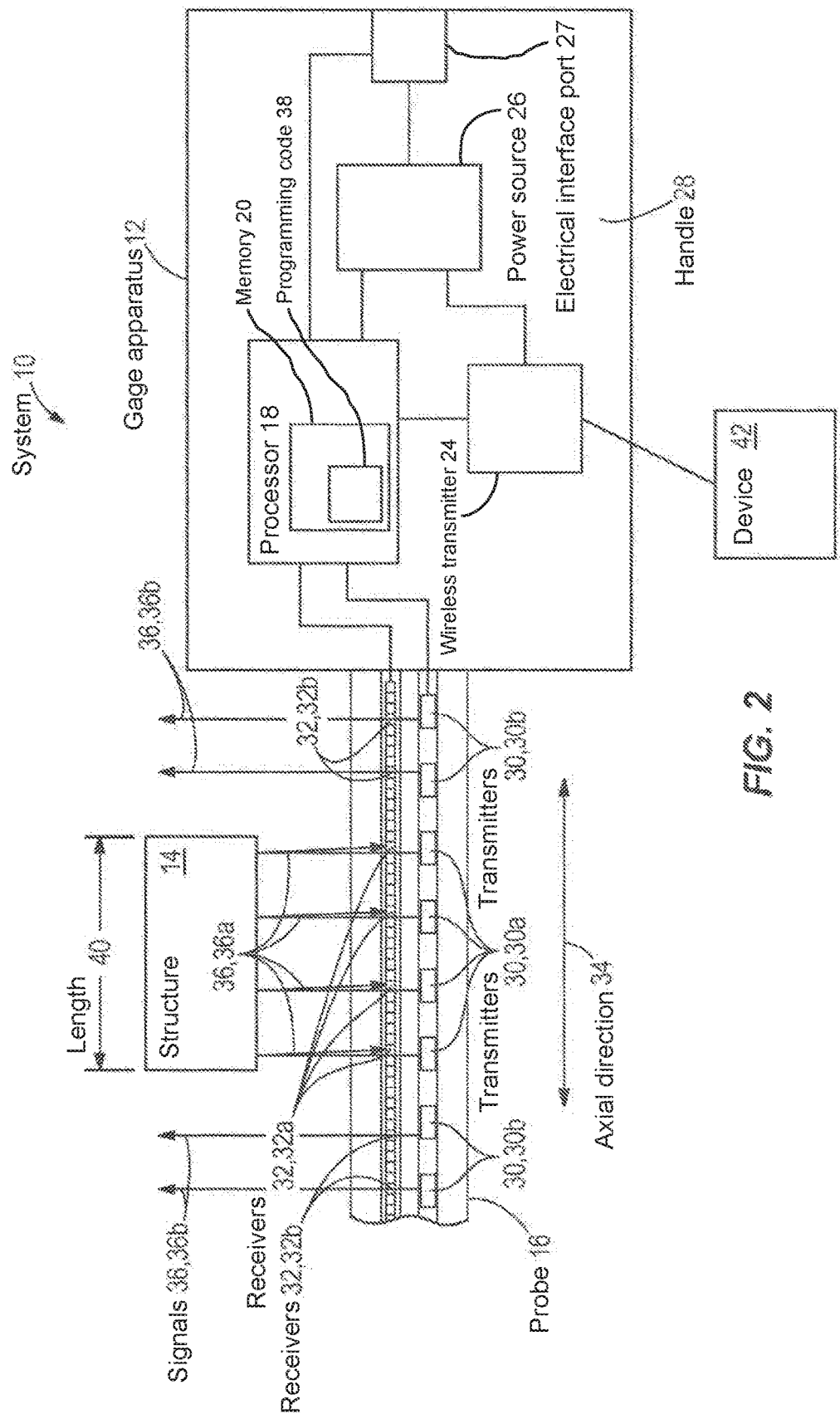
FIG. 2 illustrates an enlarged cross-section view through the system of FIG. 1.

FIG. 1 illustrates a perspective view of one embodiment of a system 10 comprising a gage apparatus 12 and a structure 14. FIG. 2 illustrates an enlarged cross-section view through the system 10 of FIG. 1. The gage apparatus 12 may be used to measure the structure 14. The structure 14 may comprise a plate, a stack-up of members, a plate including a hole and a nut or nut plate assembly aligned with the hole, a stack-up of members including a hole aligned with the hole, or another type of structure which may or may not have a hole. In one embodiment, the structure 14 may comprise an aircraft, an aircraft part, or aircraft parts. In other embodiments, the structure 14 may vary. As shown collectively in FIGS. 1 and 2, the gage apparatus 12 includes a probe 16, a processor 18, a memory 20, a display 22, a wireless transmitter 24, a power source 26, an electrical interface port 27, and a handle 28. In other embodiments, the gage apparatus 12 may include varying components. In the embodiment in which the structure 14 comprises a hole, the probe 16 of the gage apparatus 12 may be inserted into the hole of the structure 14 to measure the hole, to determine a length or an identity of a fastener to be inserted into the hole, or to determine other information. In the embodiment in which the structure 14 does not include a hole, the gage apparatus 12 may be used to measure a length of the structure 14 or to determine other information.

The probe 16 includes a plurality of transmitters 30 and a plurality of receivers 32 aligned in an axial direction 34 along the probe 16. The plurality of transmitters 30 are each configured to transmit signals 36. The signals 36a of the plurality of transmitters 30a which are disposed adjacent to the structure 14 will reflect off the structure 14 and be received by the plurality of receivers 32a indicating that the structure 14 is disposed adjacent to those plurality of receivers 32a. The signals 36b of the plurality of transmitters 30b which are disposed apart from the structure 14 will not reflect off the structure 14 and as a result will not be received by the plurality of receivers 32b indicating that the structure 14 is not disposed adjacent to those plurality of receivers 32b. In one embodiment, the plurality of transmitters 30 comprise optical transmitters and the plurality of receivers 32 comprise optical receivers. In other embodiments, the plurality of transmitters 30 and the plurality of receivers 32 may vary in type, in number, in configuration, or in location.

The processor 18 is in electronic communication with the plurality of transmitters 30, the plurality of receivers 32, the memory 20, the display 22, and the wireless transmitter 24. The memory 20 comprises programming code 38 for execution by the processor 18. The programming code 38 is configured to determine a length 40 of the structure 14 disposed adjacent to the probe 16 based on which of the plurality of receivers 32 receive signals 36 transmitted by the plurality of transmitters 30 and reflected off the structure 14. In other embodiments, the programming code 38 may be configured to determine a variety of differing items.

The programming code 38 is configured to display on the display 22 the determined length 40 of the structure 14, or to display on the display 22 an identity or a grip length of a fastener which is to be installed into the structure 14 as determined by the programming code 38 based on the determined length of the structure 14. In other embodiments, the programming code 38 may be configured to display on the display 22 a variety of different information.

The programming code 38 is configured to have the wireless transmitter 24 wirelessly transmit to a device 42 the determined length 40 of the structure 14, or the identity or a grip length of a fastener which is to be installed into the structure 14 as determined by the programming code 38 based on the determined length 40 of the structure 14. The device 42 may comprise a computer, another display, or another type of device. In other embodiments, the programming code 38 may be configured to have the wireless transmitter 24 wirelessly transmit varying information to other devices.

The power source 26 is configured to power the gage apparatus 12. In one embodiment, the power source 26 may comprise a battery. In other embodiments, the power source 26 may vary. The electrical interface port 27 may be configured to charge the power source 26, or to interface with the processor 18. In other embodiments, the electrical interface port 27 may be used for varying functions. The handle 28 is used to grip the gage apparatus 12. In other embodiments, the grip 12 may further vary.

Figure 3:
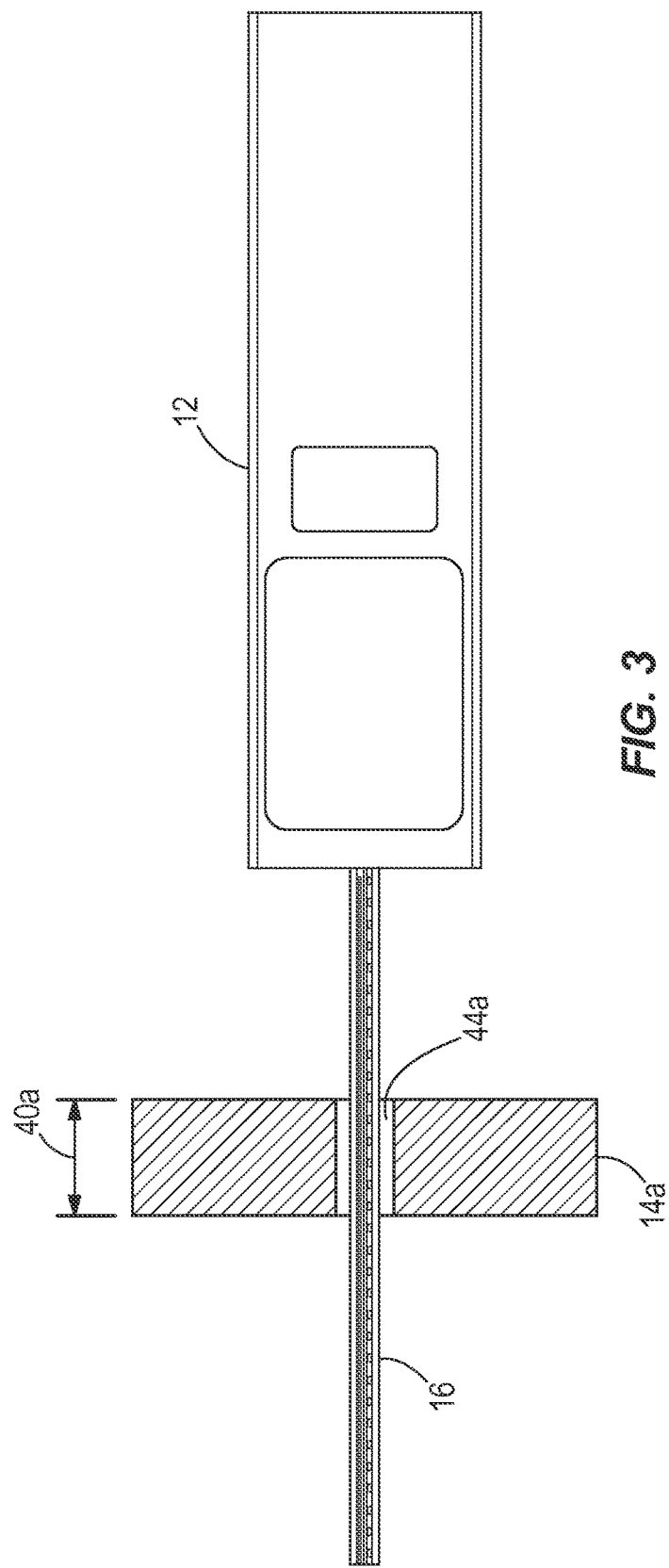
FIG. 3 illustrates a front view of one embodiment of the gage apparatus of FIG. 1 being used to measure a length of a hole of a structure by inserting the probe into the hole.
Figure 4:
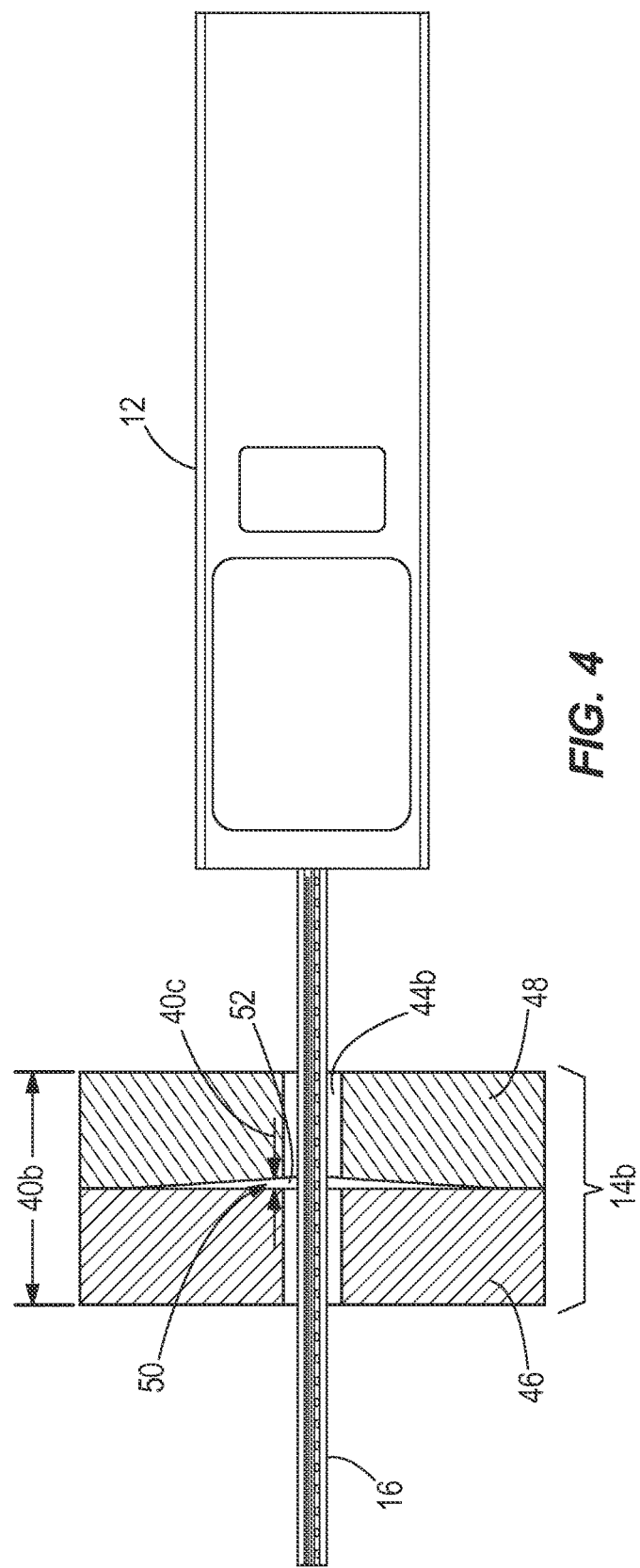
FIG. 4 illustrates a front view of another embodiment of the gage apparatus of FIG. 1 being used to measure a length of a hole of another structure by inserting the probe into the hole.

FIG. 3 illustrates a front view of one embodiment of the gage apparatus 12 of FIG. 1 being used to measure a length 40a of a hole 44a of a structure 14a by inserting the probe 16 into the hole 44a. FIG. 4 illustrates a front view of another embodiment of the gage apparatus 12 of FIG. 1 being used to measure a length 40b of a hole 44b of another structure 14b by inserting the probe 16 into the hole 44b. The another structure 14b comprises a stack-up of members 46 and 48. The gage apparatus 12 is configured to additionally detect the length 40c and location 50 of a gap 52 in-between members 46 and 48.

Figure 5:
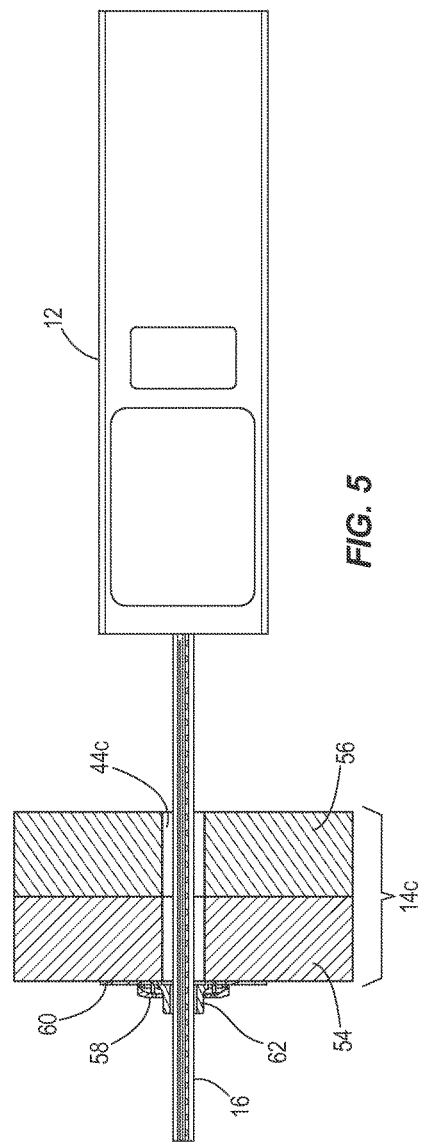
FIG. 5 illustrates a front view of yet another embodiment of the gage apparatus of FIG. 1 being used to measure a grip length of a fastener to be installed into the hole of yet another structure by inserting the probe into the hole.

FIG. 5 illustrates a front view of yet another embodiment of the gage apparatus 12 of FIG. 1 being used to measure a grip length of a fastener to be installed into the hole 44c of yet another structure 14c by inserting the probe 16 into the hole 44c. Structure 14c comprises a stack-up of members 54 and 56 with a nut plate assembly 58 attached to member 54. The nut plate assembly 58 comprises a plate 60 attached to member 54. A nut 62 may either be fixed or may float within the plate 60. Gage apparatus 12 operates to determine a total length as defined by hole 44c plus a hole associated with nut plate assembly 58.

Figure 6:
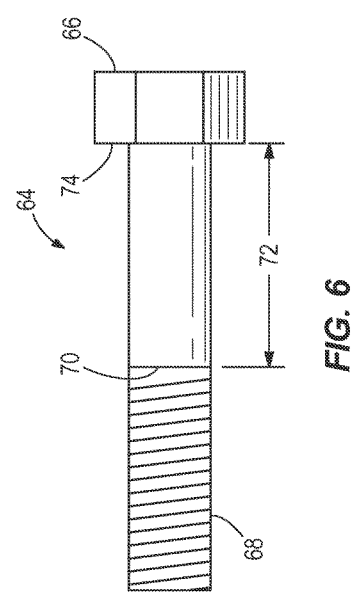
FIG. 6 illustrates a front view of one embodiment of a fastener which may be installed into the hole of the structure of FIG. 5.

FIG. 6 illustrates a front view of one embodiment of a fastener 64 which may be installed into the hole 44c of the structure 14c of FIG. 5. The fastener 64 includes a head 66, threads 68, a transition or run-out 70, and grip length 72. The grip length 72 (or shank) is defined as the length from the underside 74 of the head 66 to the transition or run-out 70 where the threads 68 begin. As discussed above with respect to FIG. 5, the gage apparatus 12 may be used to determine the grip length 72 of the fastener 64 to be installed into the hole 44c of the structure 14c of FIG. 5. In other embodiments, the gage apparatus 12 of FIG. 1 may be used to measure or determine varying items.

Figure 7:
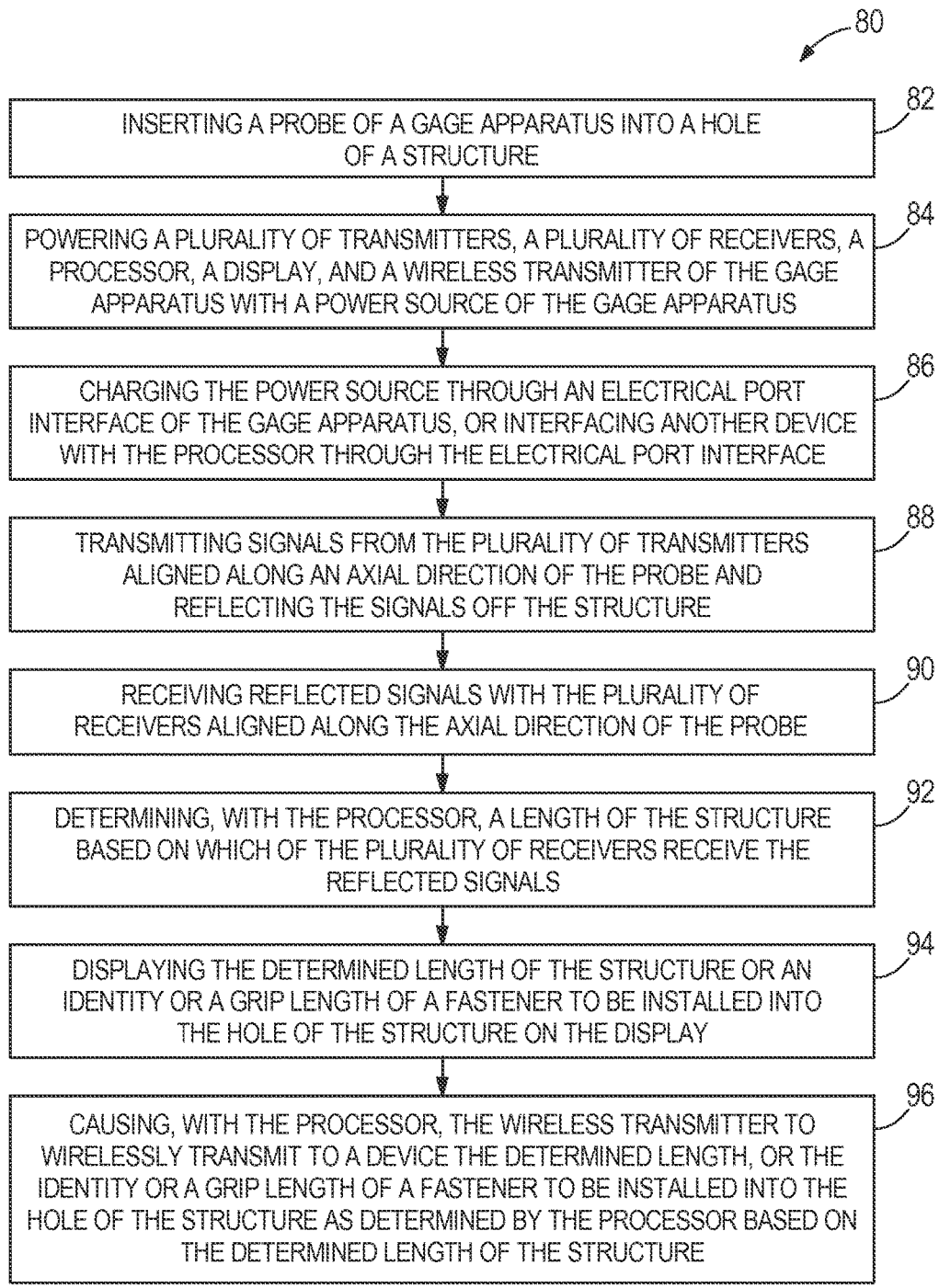
FIG. 7 illustrates a flowchart showing one embodiment of a method of measuring a length.

FIG. 7 illustrates a flowchart showing one embodiment of a method 80 of measuring a length. The method 80 may utilize the gage apparatus of FIG. 1 or any of the embodiments disclosed herein. In step 82, a probe of a gage apparatus is inserted into a hole of a structure. The structure may comprise a plate or a stack-up of members. A nut or nut plate assembly may be aligned with the hole of the structure. In other embodiments, the structure may vary. In step 84, a plurality of transmitters, a plurality of receivers, a processor, a display, and a wireless transmitter of the gage apparatus are powered with a power source of the gage apparatus. The power source may comprise a battery. In other embodiments, the power source may vary. In step 86, the power source is charged through an electrical port interface of the gage apparatus, or another device interfaces with the processor through the electrical port interface.

In step 88, signals are transmitted from the plurality of transmitters aligned along an axial direction of the probe and the signals are reflected off the structure. In one embodiment, the signals may comprise optical signals. In other embodiments, the signals may vary. In step 90, the reflected signals are received with the plurality of receivers aligned along the axial direction of the probe. In step 92, the processor determines a length of the structure based on which of the plurality of receivers receive the reflected signals. The processor is in electronic communication with the plurality of transmitters, the plurality of receivers, and a memory. The processor determines the length of the structure by executing programming code stored in the memory.

In step 94, the determined length of the structure or an identity or a grip length of a fastener to be installed into the hole of the structure is displayed on the display. The display is in electronic communication with the processor. The programming code determines the length of the structure or the identity or the grip length of the fastener to be installed into the hole of the structure based on the determined length of the structure. In step 96, the programming code causes the wireless transmitter to wirelessly transmit to a device the determined length, or the identity or a grip length of a fastener to be installed into the hole of the structure as determined by the programming code based on the determined length of the structure. In one embodiment, step 94, step 96, or a subsequent step may further include a user selecting the particular fastener identified by the gage apparatus and installing the particular fastener into the hole of a structure which may comprise an aircraft or another type of structure. In other embodiments, one or more steps of the method 80 may be modified in substance or in order, may not be followed, or one or more additional steps may be added.

Figure 8:
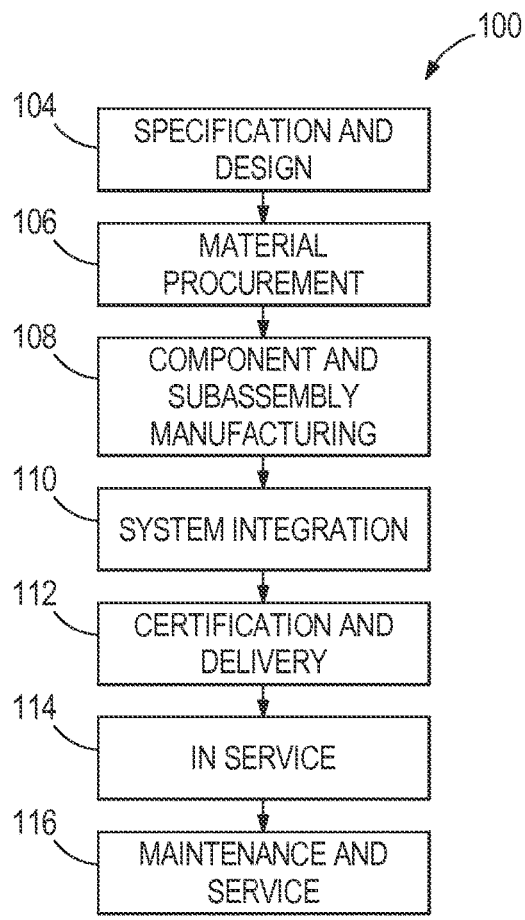
FIG. 8 illustrates a flow diagram showing one embodiment of aircraft production and service methodology.
Figure 9:
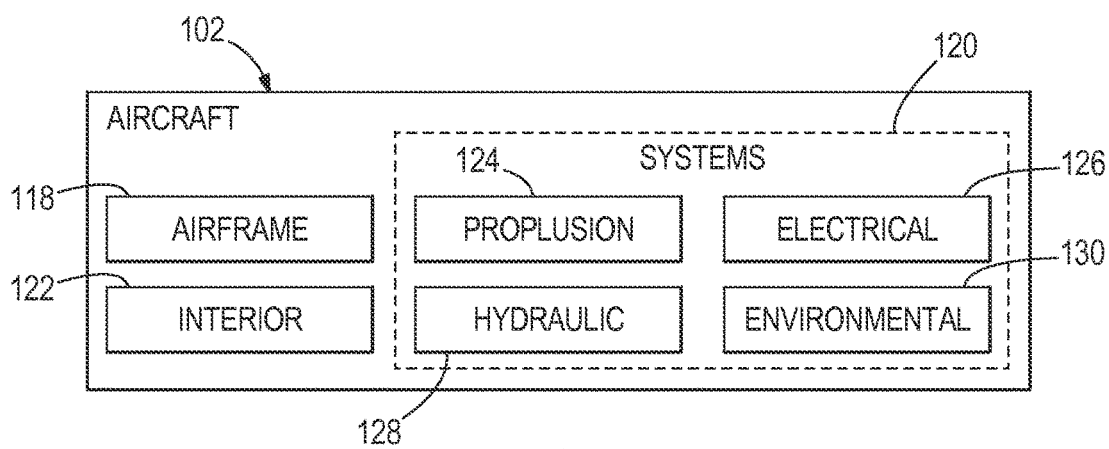
FIG. 9 illustrates one embodiment of a block diagram of an aircraft.

Embodiments of the disclosure may find use in a variety of potential applications, particularly in the transportation industry, including for example, aerospace, marine, automotive applications, and other applications where automated layup equipment may be used. Thus, referring now to FIGS. 8 and 9, embodiments of the disclosure may be used in the context of an aircraft manufacturing and service method 100 as shown in FIG. 8 and an aircraft 102 as shown in FIG. 9. Aircraft applications of the disclosed embodiments may include, for example, without limitation, layup of stiffener members such as, without limitation beams, spars and stringers, to name only a few. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116, which may also include modification, reconfiguration, refurbishment, and so on.

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 9, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries, such as the marine and automotive industries.

Systems and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

One or more embodiments of the gage apparatus of the disclosure eliminates internal mechanical components which need to be compressed with a human hand thereby reducing or eliminating the likelihood for fatigue, for mechanical wear, for break-down, or for error in measurements of a structure or of a fastener to be installed into the structure.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. Furthermore, it is to be understood that the disclosure is defined by the appended claims. Accordingly, the disclosure is not to be restricted except in light of the appended claims and their equivalents.

The invention claimed is:

1. A gage apparatus for measuring a length associated with an assembly comprising at least one member in a fixed arrangement with a nut, the at least one member defining a first hole extending therethrough, the nut defining a second hole extending therethrough and aligned with the first hole, the nut configured to physically couple with a fastener when inserted through the first hole and the second hole, the gage apparatus comprising:

a probe extending in an axial direction and comprising a plurality of transmitters and a plurality of receivers each arranged along the axial direction, the probe configured to be inserted through the first hole and the second hole to any of a plurality of positions along the axial direction;

a processor in electronic communication with the plurality of transmitters and the plurality of receivers; and a memory in electronic communication with the processor, wherein the memory comprises programming code for execution by the processor, and wherein the programming code is configured to:

determine, when the probe is at any of the plurality of positions along the axial direction, and based on which of the plurality of receivers receive signals transmitted by the plurality of transmitters and reflected off the assembly, (i) a total length of the assembly that includes an extent of the first hole and an extent of the second hole in the axial direction and (ii) whether a gap exists between the at least one member and the nut, and determine, based on the determined total length of the assembly, a grip length for the fastener.

2. The gage apparatus of claim 1 wherein the plurality of transmitters comprise optical transmitters and the plurality of receivers comprise optical receivers.

3. The gage apparatus of claim 1 further comprising a display device in electronic communication with the processor, wherein the programming code is further configured to:

display, on the display device, one or more of the determined total length of the assembly, an identity of the fastener, and the determined grip length for the fastener.

4. The gage apparatus of claim 1 further comprising a wireless transmitter in electronic communication with the processor, wherein the programming code is further configured to:
    operate the wireless transmitter to wirelessly transmit one or more of the determined total length of the assembly, an identity of the fastener, and the determined grip length for the fastener.

5. The gage apparatus of claim 1 further comprising an electrical interface port configured to charge a battery of the gage apparatus, or to interface with the processor.

6. The gage apparatus of claim 1 further comprising a handle from which said probe extends.

7. The gage apparatus of claim 1, wherein the programming code is further configured to:
    determine, from a plurality of predefined fastener types stored in the memory, an identity of the fastener corresponding to the determined grip length.

8. A method of measuring a length associated with an assembly comprising at least one member in a fixed arrangement with a nut, the at least one member defining a first hole extending therethrough, the nut defining a second hole extending therethrough and aligned with the first hold, the nut configured to physically couple with a fastener when inserted through the first hole and the second hole, the method comprising:
    inserting a probe through the first hole and the second hole to a first position along an axial direction, the probe configured to be inserted to any of a plurality of positions along the axial direction, the plurality of positions along the axial direction including the first position, the probe extending in the axial direction and comprising a plurality of transmitters and a plurality of receivers each arranged along the axial direction;
    transmitting, when the probe is at the first position, signals from the plurality of transmitters, wherein at least a portion of the transmitted signals are reflected off the assembly as reflected signals;
    determining, using a processor in electronic communication with the plurality of transmitters and the plurality of receivers, and based on which of the plurality of receivers receive the reflected signals, a total length of the assembly that includes an extent of the first hole and an extent of the second hole in the axial direction, wherein the processor is configured to determine the total length of the assembly when the probe is at any of the plurality of positions along the axial direction;
    determining, when the probe is at any of the plurality of positions along the axial direction, whether a gap exists between the at least one member and the nut; and
    determining, based on the determined total length of the assembly, a grip length for the fastener.

9. The method of claim 8 wherein transmitting signals comprises transmitting optical signals.

10. The method of claim 8 further comprising:
    displaying, using a display device in electronic communication with the processor, one or more of the determined total length of the assembly, an identity of the fastener, and the determined grip length for the fastener.

11. The method of claim 8 further comprising:
    wirelessly transmitting, using a wireless transmitter in electronic communication with the processor, one or more of the determined total length of the assembly, an identity of the fastener, and the determined grip length for the fastener.

12. The method of claim 8 further comprising one or more of:
    charging, through an electrical interface port, a battery powering the plurality of transmitters, the plurality of receivers, and the processor; and
    communicatively interfacing with the processor through the electrical interface port.

13. The method of claim 8, wherein the processor is in electronic communication with a memory, the method further comprising:
    determining, from a plurality of predefined fastener types stored in the memory, an identity of the fastener corresponding to the determined grip length.

14. An apparatus for use with an assembly comprising a first member and an adjacent second member, the first member defining a first hole extending therethrough, the second member defining a second hole extending therethrough and aligned with the first hole, the apparatus comprising:
    a probe extending in an axial direction and comprising a plurality of transmitters and a plurality of receivers each arranged along the axial direction, the probe configured to be inserted through the first hole and the second hole to any of a plurality of positions along the axial direction; and
    a processor configured to:
        transmit signals using the plurality of transmitters; and
        determine, when the probe is at any of the plurality of positions along the axial direction, and based on reflected signals received by the plurality of receivers, the reflected signals comprising reflections of the transmitted signals off the assembly, whether a gap exists between the first member and the second member.

15. The apparatus of claim 14, further comprising:
a display device in electronic communication with the processor, wherein the processor is further configured to display, on the display device, whether the gap exists between the first member and the second member.

16. The apparatus of claim 14, further comprising:
a wireless transmitter in electronic communication with the processor, wherein the processor is further configured to operate the wireless transmitter to wirelessly transmit information indicating whether the gap exists between the first member and the second member.

17. The apparatus of claim 14, wherein the processor is further configured to:
    determine, based on the reflected signals, a length of the gap along the axial direction.

18. The apparatus of claim 14, wherein the processor is further configured to:
    determine, based on which of the plurality of receivers receive the reflected signals, a position of the gap relative to the assembly.

19. The apparatus of claim 14, wherein the plurality of transmitters comprise optical transmitters and the plurality of receivers comprise optical receivers.

20. The apparatus of claim 14, further comprising:
an electrical interface port configured for one or more of charging a battery of the apparatus and communicatively interfacing with the processor.

21. The apparatus of claim 14, further comprising:
a handle from which the probe extends, wherein the processor is disposed within the handle.

* * * * *

UNITED STATES PATENT AND TRADEMARK OFFICE
CERTIFICATE OF CORRECTION

| | |
|---|---|
| PATENT NO. | : 9,797,707 B2 |
| APPLICATION NO. | : 14/150724 |
| DATED | : October 24, 2017 |
| INVENTOR(S) | : Mark D. Bumgardner |

It is certified that error appears in the above-identified patent and that said Letters Patent is hereby corrected as shown below:

In Column 7, Line 23, in Claim 8, delete "hold," and insert -- hole, --, therefor.

Signed and Sealed this
Twentieth Day of February, 2018

Andrei Iancu
*Director of the United States Patent and Trademark Office*